UNITED STATES PATENT OFFICE.

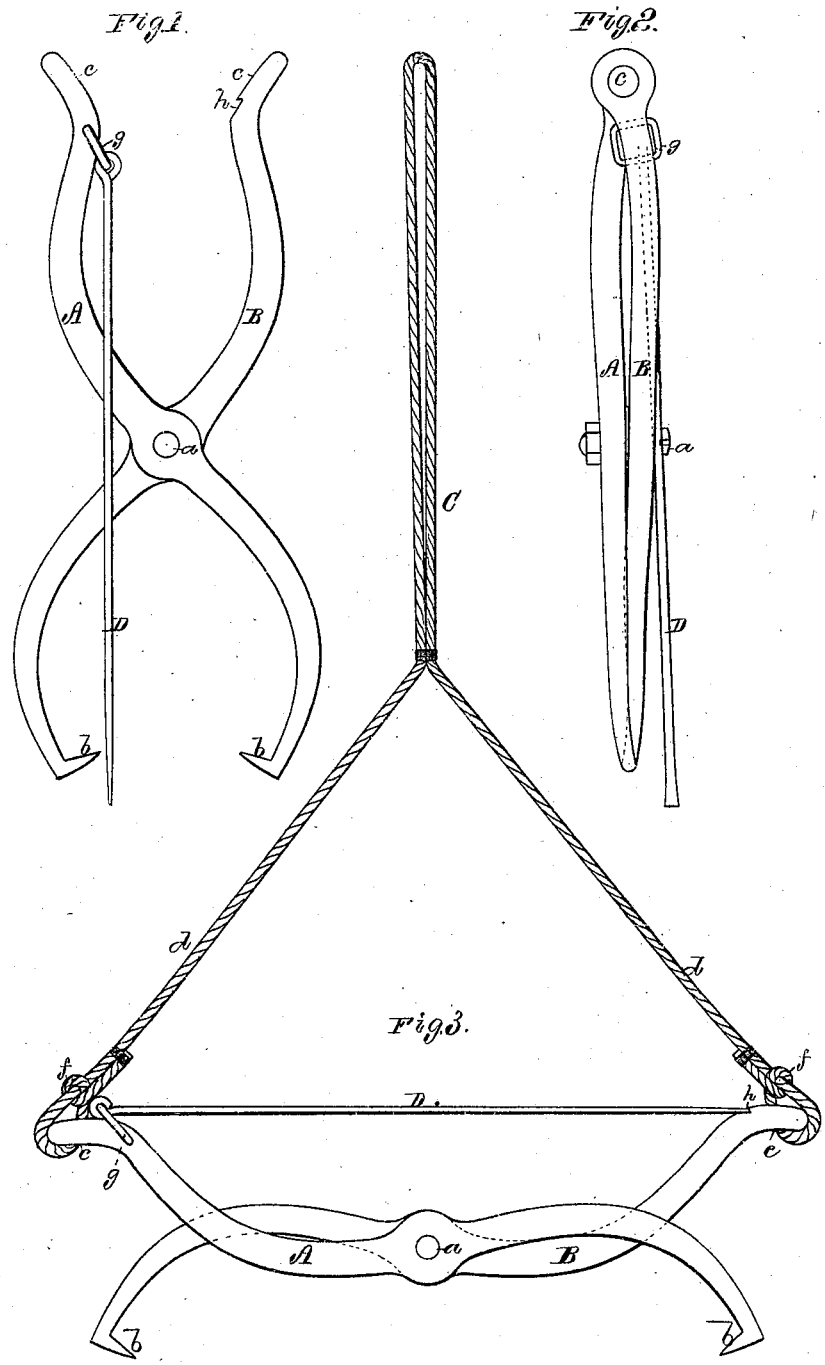

JOHN TAPPAN, OF HAVERHILL, MASSACHUSETTS.

IMPROVEMENT IN HOISTING-HOOKS.

Specification forming part of Letters Patent No. 148,263, dated March 3, 1874; application filed February 4, 1874.

*To all whom it may concern:*

Be it known that I, JOHN TAPPAN, of Haverhill, of the county of Essex and State of Massachusetts, have invented a new and useful Improvement in Hoisting-Hooks; and do hereby declare the same to be fully described in the following specification and represented in the accompanying drawings, of which—

Figure 1 is a side elevation, and Fig. 2 an edge view, of a pair of "hoisting-hooks" provided with my invention. Fig. 3 is a side view of the hoisting-hooks and their adjuncts, to be hereinafter described, as they appear, or in the positions they are made to assume, preparatory to the hoisting-hooks being lowered upon a box or article to be seized by them.

The hoisting-hooks are two curved levers, A B, shaped as shown in the drawings, and crossed upon each other, and pivoted together at the crossing, the pivot or common fulcrum being shown at $a$. At their lower ends these levers are provided with teeth $b\ b$, projecting rearward from them, and formed in manner as represented. At their upper ends the levers are furnished or made with eyes $c\ c$, to receive the two branch lines $d\ d$ of the sustaining-rope C, such branch lines being connected with or fastened to the eyes, or run through them, and knotted or tied in knots $f\ f$.

My invention consists in the combination of such a pair of hooked, crossed, and pivoted levers, usually termed hoisting-hooks, and a rod or mechanism for holding them open while they may be descending or being lowered for the purpose of being engaged with or seizing upon a box or other article, the said rod or mechanism on the levers coming into contact with the box or article, being by the blow or force of concussion thrown out of engagement with one of the levers, in a manner to allow the levers on being raised to close upon and hook or catch hold of the box or article. The rod shown at D, I usually hinge or connect at one end to one of the levers near its eye by a ring, $g$, going through such rod and the lever, the other lever, near its upper end, being provided with a notch, $h$, arranged as shown, to receive the other end of the rod, which may be flattened or made wedge-shaped for the purpose.

With the rod appended to the hoisting-hooks, notched as described, the labor of one or more men generally heretofore required to apply the hooks to a box preparatory to it being raised from one story to another of a building may be dispensed with, the party who may be employed to raise the box having only to set the rod in the notch preparatory to lowering the hoisting-hooks upon the box.

I make no claim to the hoisting-hooks without the rod D and the notch $h$; but

I claim—

The combination of the rod D and notch $h$ with the two hooked levers A B, pivoted together, and provided with the ropes C $d\ d$, all being substantially as specified and represented.

JOHN TAPPAN.

Witnesses:
 R. H. EDDY,
 JOHN R. SNOW.